United States Patent [19]
Justice et al.

[11] Patent Number: 5,606,324
[45] Date of Patent: Feb. 25, 1997

[54] RADAR SYSTEM

[75] Inventors: Walter S. Justice, Lexington; David A. Marquis, Medford; Ronald A. Wagner, Chelmsford, all of Mass.

[73] Assignee: Raytheon Company, Lexington, Mass.

[21] Appl. No.: 569,374

[22] Filed: Dec. 7, 1995

[51] Int. Cl.$^6$ ...................................................... G01S 13/66
[52] U.S. Cl. .......................... 342/62; 342/112; 244/3.19
[58] Field of Search .............................. 342/62, 112, 129; 244/3.15, 3.19; 364/462

[56] References Cited

U.S. PATENT DOCUMENTS

| | | | |
|---|---|---|---|
| 3,733,604 | 5/1973 | Smith | 342/62 |
| 5,406,290 | 4/1995 | James et al. | 342/119 |

*Primary Examiner*—Daniel T. Pihulic
*Attorney, Agent, or Firm*—Donald F. Mofford

[57] ABSTRACT

A radar system having a transmitter for transmitting a series of radio frequency (RF) pulses with sequential, incrementally changing carrier frequencies. A receiver receives energy from multiple scattering points of an object reflecting such transmitted RF pulses. The received energy from each one of such scattering points includes a series of radio frequency (RF) pulses corresponding to the transmitted pulses delayed in time, $\tau$, from the transmitted pulses an amount proportional to the range to such scattering point and shifted in frequency from the carrier frequency an amount proportional to the velocity of such scattering point. The receiver includes a heterodyning section, responsive to a range tracking error signal, $\epsilon_R$, and a velocity tracking error signal, $\Delta_{VEL}$, for producing a series of pulsed signals for each one of the scattering points. Each one of the pulsed signals for any given scatterer sequentially changes in phase, $\phi$, at a rate, $\Delta\phi/\Delta T$, related to the range to the scattering point producing such one of the pulsed signal series. A processor, responsive to each of the series of pulsed signals produced by the heterodyning section, unambiguously determines from the frequency spectrum thereof the range tracking error signal, $\epsilon_R$, and velocity tracking error signal, $\Delta_{VEL}$, for each of the scattering points as well as the range centroid.

8 Claims, 7 Drawing Sheets

M IS THE NUMBER OF SCATTERERS EXCEEDING THRESHOLD

RADAR SYSTEM

BACKGROUND OF THE INVENTION

This invention relates generally to radar systems and more particularly to radar systems adapted to track energy reflected by different scattering points of an object.

As is known in the art, a radar system includes a transmitter and antenna for transmitting and directing radar energy towards an object. The object reflects portions of the transmitted energy. A portion of the reflected energy is received by the antenna and is directed to a receiver of the radar system. In response to the received energy, the receiver produces signals to enable the radar system to track the object. The tracking signals generally track the centroid of the target's reflected energy. Thus, for example, where the radar system is carried by a missile to intercept an incoming target, the tracking signals are fed to both the antenna and to the missile's guidance system to direct the missile toward the centroid of the target's reflected energy. In some applications, however, it is necessary to track energy from a number of different scattering points on the target.

SUMMARY OF THE INVENTION

In accordance with the present invention, a radar system is provided having a transmitter for transmitting a series of radio frequency (RF) pulses with sequential, incrementally changing carrier frequencies from pulse to pulse. A receiver receives energy from scattering points of an object reflecting such transmitted RF pulses. The received energy from each one of such scattering points includes a series of radio frequency (RF) pulses corresponding to the transmitted pulses delayed in time, $\tau$, from the transmitted pulses an amount proportional to the round trip range to such scattering point and shifted in frequency from the carrier frequency an amount proportional to the velocity of such scattering point. The receiver includes a heterodyning section, responsive to a range tracking error signal, $\epsilon_R$, and a velocity tracking error signal, $\Delta_{VEL}$, for producing a series of pulsed signals for each one of the scattering points. Each one of the pulsed signals sequentially changes in phase, $\phi$, at a rate, $\Delta\phi/\Delta T$, related to the range to the scattering point producing such one of the pulsed signals. A processor, responsive to each one of the series of pulsed signals produced by the heterodyning section, determines from the frequency spectrum thereof the range tracking error signal, $\epsilon_R$, and velocity tracking error signal, $\Delta_{VEL}$.

In accordance with one feature of the invention, the heterodyning section includes first and second heterodyning sections. The first heterodyning section is fed by the series of received pulses and a series of internal reference pulses corresponding to the series of transmitted pulses delayed in time an amount related to the sum of an initial estimate of the range to a region of the object being tracked, $R_{EST}$, and the range tracking error signal, $\epsilon_R$, for producing a series of pulsed signals having frequencies related to both the velocity of the object and the ranges to the scattering points. The second heterodyning section is fed by the series of pulsed signals produced by the first heterodyning section, an initial estimate of the velocity of the object, $V_{EST}$, and the velocity tracking error signal, $\Delta_{VEL}$, for producing a series of pulses having intermediate frequency components related to the differences between both the doppler velocity of the object and ranges to the scattering points relative to $(V_{EST} \pm \Delta_{VEL})$ and $(R_{EST} \pm \epsilon_R)$, respectively. The processor is responsive to the frequency spectrum of the series of pulses produced by the second heterodyning section and determines, from such frequency spectrum, the range tracking and velocity tracking error signals, $\epsilon_R$, $\Delta_{VEL}$, respectively.

In accordance with another feature of the invention, the second heterodyning section includes a bandpass filter section for passing frequency components within a predetermined pass band while rejecting frequency components outside such pass band. The bandpass filter section has the pass band thereof selected to pass the frequency components related to the changes in both the velocity of the object and the ranges to the scattering points. The processor, in response to the frequency spectrum of the signals passed by the bandpass filter section determines, from such frequency spectrum of the passed signals, the frequency components thereof and from such frequency components, the range and velocity tracking error signals, $\epsilon_R$, $\Delta_{VEL}$, respectively.

In accordance with another feature of the invention, the second heterodyning section includes a range gating section fed by the range tracking error signal, $\epsilon_R$, for passing to the bandpass filter section intermediate frequency signals associated with reflections from the scatterers of the object within a predetermined window, $\Delta_R$, of ranges. The range gating section includes a range tracker for producing a set of bipolar range error signals, SG, having magnitudes related to the differences between the updated estimated range $R'_{EST} = R_{EST} \pm \epsilon_R$, to the region of the object being tracked and a set of measured ranges to the scatterers of the object being tracked and a polarity related to whether the ranges to the scatterers of the object being tracked are forward of, or rearward of, the estimated range to the region of the object. The processor determines the frequency Components in the bipolar range error signal, SG, each corresponding to a different one of the scatterers, and from such determined frequency components, the range tracking and velocity tracking error signals, $\epsilon_R$, $\Delta_{VEL}$, respectively.

BRIEF DESCRIPTION OF THE DRAWING

For a more complete understanding of the invention, reference is now made to the following drawings, in which:

FIGS. 3A–3D are diagrams useful in understanding the operation of the radar system of FIG. 1, FIG. 3A being a time history of the carrier frequency of a series of pulses transmitted by the radar system, FIG. 3B being a time history of radar returns from a scattering point of an object reflecting the transmitted radar pulses.

DESCRIPTION OF THE PREFERRED EMBODIMENTS

Figure 1:
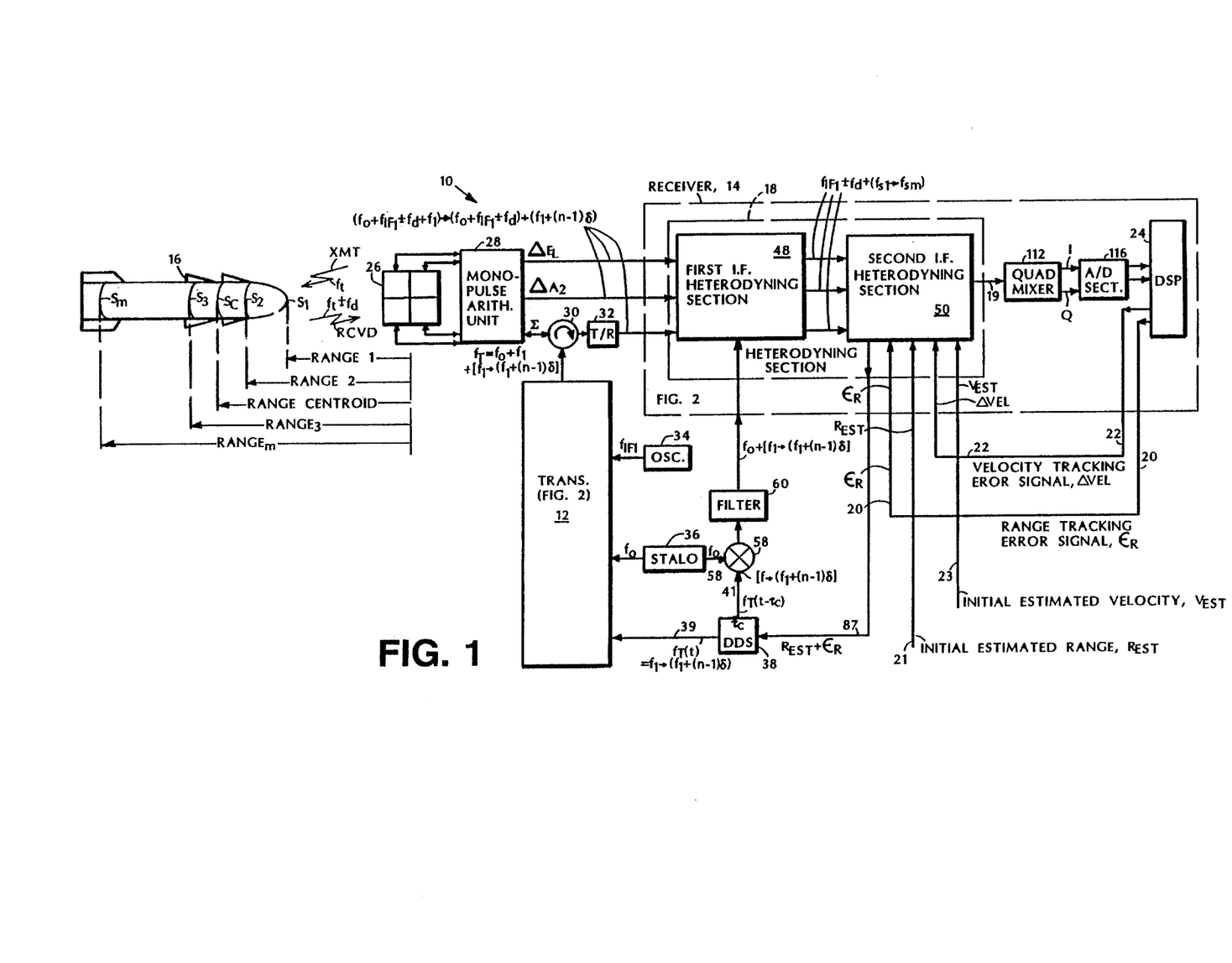
FIG. 1 is a block diagram of a radar system according to the invention; to the invention.
Figure 2:
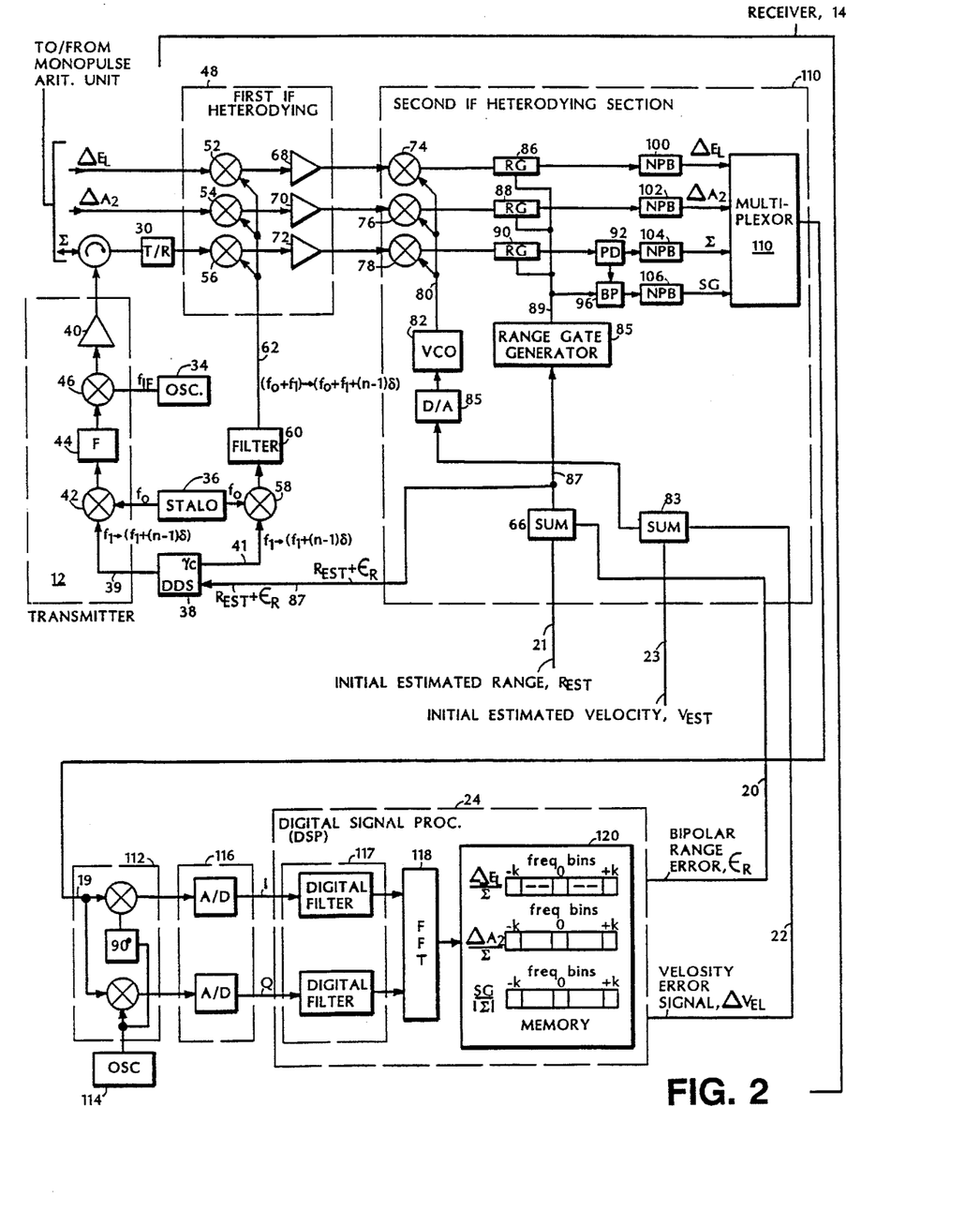
FIG. 2 is a more detailed block diagram of the radar system of FIG. 1.

Referring now to FIGS. 1 and 2, a radar system 10 is shown having: a transmitter 12 for transmitting a series of radio frequency (RF) pulses having sequential, incrementally changing carrier frequencies from pulse to pulse and a receiver 14 adapted to receive energy from scattering points $S_1–S_m$ of an object 16 reflecting such transmitted RF pulses. The received energy from each one of such scattering points $S_1–S_m$ comprises a series of radio frequency (RF) pulses corresponding to the transmitted pulses delayed in time from the transmitted pulses an amount, τ, proportional to the round trip range to such scattering point and shifted in frequency from the carrier frequency an amount proportional to the doppler velocity of such scattering point.

The receiver 14 includes a heterodyning section 18, fed by a range tracking error signal, $\epsilon_R$, on line 20, a doppler velocity tracking error signal, $\Delta_{VEL}$, on line 22, and an initial estimate of the range, $R_{EST}$, to the object 16 on line 21 and an initial estimate of the doppler velocity of the object 16 on line 23, $V_{EST}$. (These initial estimates of range and velocity may be obtained by any conventional radar system, such as a conventional pulsed doppler radar system, not shown). In response to such signals, the heterodyning section 18 produces on output 19 a series of pulsed signals from the series of pulses produced from the reflected energy by each one of the scattering points $S_1–S_m$. Each one of the series of pulsed signals produced on output 19 by a given scatterer, sequentially changes in phase, φ, at a rate, $\Delta\phi/\Delta T=2\pi f_{S_n}$, related to the range to each scattering point, $S_n$ producing such one of the series of pulsed signals. Further, the output 19, in addition to having the frequency components $f_{S1}$ through $f_{Sm}$ corresponding to the ranges $R_1$ through $R_m$ of scattering points $S_1$ through $S_m$, respectively, has a frequency contribution, $\Delta f_d$, (doppler shift) related to the rate of change of the radial range, $\Delta R/\Delta T$ (i.e., the doppler velocity) of the object 16. The radar system 10 includes a processor 24 responsive to each one of the series of pulsed signals produced at output 19 by the heterodyning section 18, for determining from the frequency spectrum thereof (i.e., the frequencies $(f_{S1}\pm\Delta f_d)+(f_{S2}\pm\Delta f_d)+(f_{S3}\pm\Delta f_d)\ldots+(f_{Sm}\pm\Delta f_d)$, the range tracking error and velocity tracking error signals, $\epsilon_R$, $\Delta_{VEL}$, respectively, on lines 20 and 22, respectively.

Figure 3A:
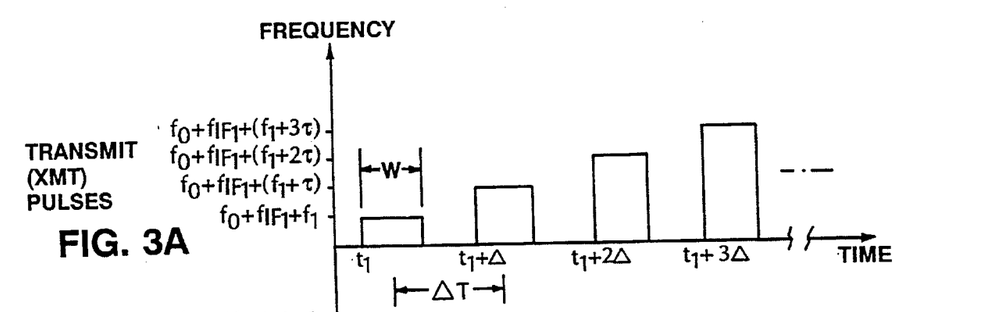
Figure 4A:
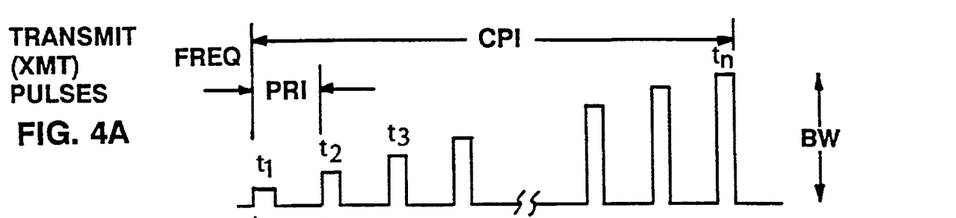
FIGS. 4A–4H are timing histories useful in understanding the operation of the radar system of FIGS. 1 and 2.

More particularly, the monopulse radar system 10 is a monopulse radar system where the transmitter section 12 and receiver section 14 share a conventional monopulse antenna 26, monopulse arithmetic unit 28, circulator 30, transmit/receive (T/R) switch 32, intermediate frequency oscillator 34, stable local oscillator (STALO) 36, and direct digital synthesizer (DDS) 38, as shown. Here, transmitter section 12, shown in detail in FIG. 2, includes a power amplifier 40 adapted to transmit, for each one of a series of coherent pulse intervals (CpIs), a series of radio frequency (RF) pulses having sequential, incrementally changing, here incrementally increasing, carrier frequencies, $f_T=f_O+f_{IF1}+f_1$ to $f_O+f_{IF1}+[f_1+(n-1)\delta]$, as shown in FIG. 3A. Thus, referring also to FIG. 4A, for each CPI, transmitted pulses (XMT) are produced at times $t_1, t_2, t_3, \ldots t_n$, where: $t_2=t_1+\Delta T$, $t_3=t_1+2\Delta T$, $t_4=t_1+3\Delta T, \ldots t_n=t_1+(n-1)\Delta T$ is the pulse repetition interval (PRI). Each one of the pulses has a time duration, or pulse width, W. The carrier frequencies, $f_T$, of the pulses produced at times $t_1$ to $t_n$ are $f_O+f_{IF1}+f_1$ to $f_O+f_{IF1}+[f_1+(n-1)\delta]$, respectively, as shown in FIG. 3A.

More particularly, referring also to FIGS. 1 and 2, the stable local oscillator (STALO) 36, shared by the transmitter 12 and receiver 14, produces a radio frequency signal having a frequency $f_O$. The direct digital synthesizer (DDS) 38, also shared by the transmitter 12 and the receiver 14, produces, for each CPI, a sequence of pulses having the frequencies $f_1$ to $(f_1+(n-1)\delta)$ on line 39, where: for a total of n pulses, the nth pulse has a frequency=$f_1+(n-1)\delta$, i.e., the first pulse has a frequency=$f_1$. The STALO 36 produced signal and the DDS 38 produced series of pulses are mixed in mixer 42 and then filtered in band pass filter 44 to produce, for each CPI, a series of pulses having sequentially increasing beat frequencies $f_O+f_1$ to $f_O+(f_1+(n-1)\delta)$. The produced beat frequency signals are mixed in mixer 46 with a first intermediate frequency signal produced by the IF oscillator 34 having a frequency $f_{IF1}$ to produce, after amplification in amplifier 40, the series of transmitted pulses (XMT) having carrier frequencies, $f_T=(f_O+f_{IF1})+f_1$ to $(f_O+f_{IF1})+(f_1+(n-1)\delta)$, as shown in FIG. 3A.

Figure 3B:
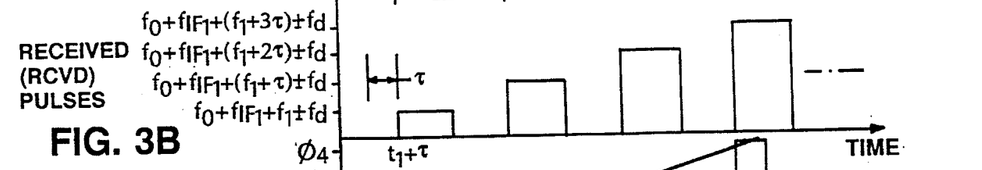
Figure 4B:
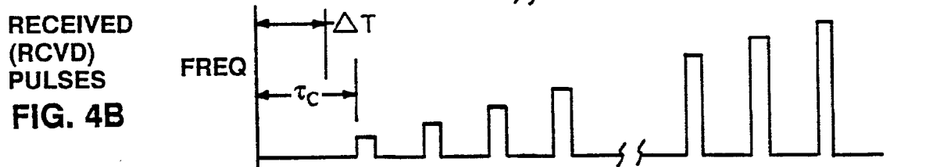

The receiver 14 is adapted to receive energy from scattering points $S_1–S_m$ of an object 16 reflecting such transmitted RF pulses. The received energy from each one of such scattering points, say point $S_i$ comprises a series of radio frequency (RF) pulses (RCVD) corresponding to the transmitted pulses delayed in time, $\tau_i$, from the series of transmitted pulses an amount proportional to the range, $R_i$, to such scattering point, $S_i$. Thus, for an exemplary one of the scattering points, here a scattering point $S_1$ at range $R_1$, the series of received pulses is shown in FIGS. 3B and 4B. It should be noted that reflections from scatterers $S_2–S_m$ also occur at times within the pulse width, W. Further, each one of the reflections from each one of the scatterers $S_1–S_m$ is shifted in frequency from the carrier frequency, $f_T$, an amount, $f_d$, proportional to the doppler velocity of such scattering point and commonly referred to as the doppler frequency shift. It should be noted that because here all scattering points, $S_1–S_m$ are on the same object 16, the doppler frequency, $f_d$, will be the same for each of the scattering points, $S_1–S_m$.

Figure 3C:
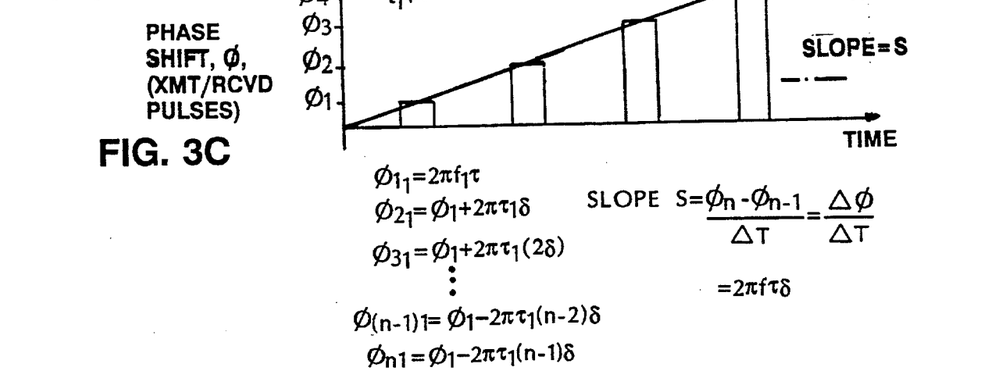
FIG. 3C being a representative time history of the difference in phase between the transmitted pulses and the received pulses of a particular one of the scatterers having a small range error, and FIG. 3D being a diagram showing the relationship between the rate of change in phase between the transmitted pulses and the received pulses for scattering points at different ranges from the radar system of FIGS. 1 and 2.
Figure 3D:
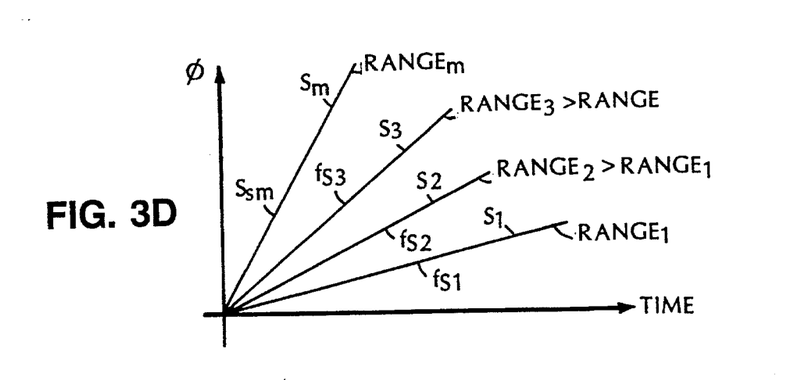

More particularly, the train of pulses for each one of the scattering points will have frequencies $f_T\pm f_d=(f_O+f_{IF1}\pm f_d+f_1)$ to $(f_O+f_{IF1}\pm f_d)+(f_1+(n-1)\delta)$; however, the train of pulses from each one of the scatterers $S_1$-$S_m$ will be delayed in time from the transmitted train of pulses an amount τ. The amount τ is a function of the round trip range from antenna 26 to the particular one of the scattering points $S_1$-$S_m$ producing the train of received pulses. Thus, referring to FIG. 3A and 3B, for scatterer $S_I$, the received train of pulses produced by scatterer $S_1$ is delayed in time $\tau_1$. Thus, for the pulse transmitted at time $t_I$ having frequency $f_O+f_{IFI}+f_I$, there is a phase shift $\phi_{11}=2\pi f_1 \tau_1$ in the reflected received signal produced from scattering point $S_1$ in response to such transmitted pulse. For the pulse transmitted at time $t_1+\Delta T$ having frequency $f_O+f_{IF1}+(f_1+\delta)$, there is a phase shift $\phi_{21}=2\pi(f_1+\delta)\tau_1$. In like manner, for the pulse transmitted at time $t_n$ having frequency $f_O+f_{IF1}+(f_1+(n-1)\delta)$, there is a phase shift $\phi_{n1}=2\pi(f_1+(n-1)\delta)\tau_1$ in the reflected received signal produced from scattering point $S_1$ in response to such transmitted pulse, as shown in FIG. 3C. Thus, for the scattering point $S_1$, the time rate of change in phase, $\Delta\phi/\Delta T=[\phi_{21}-\phi_{11}]/2\Delta T=\text{Slope}_{S1}=2\pi f_{S1}$. For each one of the scattering points $S_1$-$S_m$, at correspondingly increasing ranges $R_1, R_2, R_3, \ldots R_m$, there is a proportionately increasing rate of change in phase corresponding to frequencies $f_{S1}, f_{S2}, f_{S3}, \ldots f_{Sm}$, as shown in FIG. 3D.

The receiver 14 includes two serially coupled heterodyning sections 48, 50. Thus, during the receive mode, the azimuth channel signal (ΔAZ), elevation channel signal (ΔEL) and sum channel signal (Σ) are produced in a conventional manner by the monopulse arithmetic unit 28 and are passed to mixers 52, 54 and 56, as shown. The DDS 38 also produces on line 41 the same incrementally increasing frequency signal as produced on line 39 but delayed in time $\tau_c$, where $\tau_c$ is the round trip time delay to the centroid of the object 16 reflected energy. That is, $\tau_c$ initially corresponds to the range $R_{EST}$; i.e. $\tau_c=[2R_{EST}/c]$, where c is the speed of light). The signals produced by the DDS 38 on line 41 are the same series of pulses produced by the DDS 38 on line 39 but delayed in time $\tau_c$. As will be described hereinafter, the DDS 38 is fed by a signal on line 87 representative of the sum of the initial estimate or the range to the centroid, i.e., $R_{EST}$, and a range tracking error signal, $\epsilon_R$. The time $\tau_c$ corresponds to the range to the scatterer, or point on the object 16, of interest, here the range, $R_c$, to the centroid of the total energy received by the scatterers $S_1$-$S_m$, i.e the "scatterer, $S_c$," at range $R_c$, as shown in FIG. 1. Therefore, $\tau_c$ corresponds to the round trip range to the scatterer, or point on the object 16, of interest, here the range, $R_c$. It is also noted that the signals on line 41 also have the sequentially changing frequencies $f_1$ to $(f_1+(n-1)\delta)$. The signals on line 41 are fed to mixer 58 along with the STALO 36 produced signal.

Figure 4C:
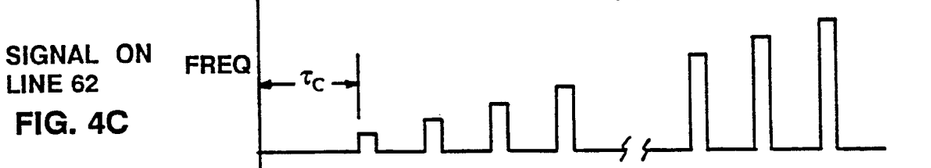

For each one of the scattering points, $S_1$-$S_m$, the beat frequency signal, produced as a result of mixing the STALO 36 signal (having the frequency $f_O$) and the time delayed, $\tau_c$, signal produced by the DDS 38, is passed through filter 60 to produce a first local oscillator signal on line 62 (FIG. 4D) for the first heterodyning section 48. For each CPI (FIG. 4A), the first local oscillator signal on line 62 (FIG. 4D) is a series of pulses having sequentially increasing frequencies $f_O+f_1$ to $f_O+(f_1+(n-1)\delta)$, as shown in FIG. 4C. The time of occurrence of the train of pulses produced by the mixer 58 and filter 60 occur at the same time as the train of pulses received from the scattering point $S_c$, as shown in FIG. 4C. More particularly, an initial estimate of the range, $R_{EST}$, to the centroid scattering point $S_c$ is fed on line 21 to the summer 66 (FIG. 2) and serves to enable DDS 38 to set an initial time delay $\tau_c$ corresponding to the round trip range to the centroid scattering point, $S_c$.

Figure 4D:
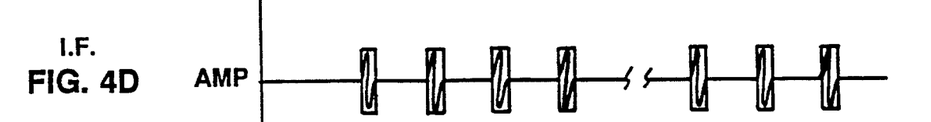

The beat frequency signals produced by the mixers 52, 54, 56 (i.e, the signals produced in the elevation channel, ΔEL, azimuth channel, ΔAZ, and sum channel, Σ, respectively) are passed by, and amplified in, amplifier/filters. 68, 70, 72 respectively, the signal produced at the output of amplifier/filter 72 being shown in FIG. 4D). For each one of the scattering points, $S_1$ to $S_m$, the sequentially increasing beat frequencies are $(f_{IF1}\pm f_d)$ plus a dc phase shift component, $[\phi_n-\phi_{n-1}]_m/\Delta T$ (FIG. 3C). For example, for the scattering point, $S_1$, discussed in connection with FIGS. 3A–3D, the sequentially increasing beat frequencies are $(f_{IF1}\pm f_d)$ plus a dc component representative of $\phi_1$ to $(f_{IF1}\pm f_d)$ plus a dc component representative of $\phi_n$ (FIG. 3C). Thus, over time, i.e. a CPI, the frequency spectrum of the signals produced at the output of mixers 52, 54, 56 will be the frequency components, $f_{S1}$ through $f_{Sm}$, each shifted by $f_{if}\pm f_d$, as shown in FIG. 3D.

Thus, in summary, the first heterodyning section 48 is fed by the series of received pulses and a series of pulses corresponding to the series of transmitted pulses delayed in time an amount related to the sum of an initial estimate of the range to a region of the object being tracked, $R_{EST}$, and the range tracking error signal, $\epsilon_R$. In response to such signals, the first heterodyning section produces a series of pulsed signals having frequencies related to both the velocity of the object and the ranges to the scattering points.

The outputs of the first heterodyne section 48 are fed to the second heterodyning section 50. Thus, the outputs of amplifier/filters 68, 70, 72 are fed to mixers 74, 76, 78, respectively, as shown. Also fed to the mixers 74, 76, 78 is a second local oscillator frequency produced on line 80 by a voltage controlled oscillator (VCO) 82. More particularly, a summer 83 sums the initial estimate of the doppler velocity of the object 16, i.e., the $V_{EST}$ signal on line 23, with the velocity error tracking signal, $\Delta_{VEL}$ on line 22. The resulting signal is converted to a corresponding analog signal by digital to analog converter (D/A) 85 to produce a second local oscillator frequency having a nominal frequency $f_{IF1}+f_{IF2}\pm f_{do}$, where $f_{do}$ is an initial estimate of the doppler frequency of object 14. The initial estimate of the doppler velocity of object 14, i.e., $V_{EST}$ is fed to line 23. This nominal frequency, $f_{IF1}+f_{IF2}\pm f_{do}$, may change an amount $\pm\Delta f_d$ in order to track changes in the doppler velocity of the object 16, in a manner to be described in detail hereinafter. Thus, the frequency produced by VCO 82, $f_{vco}=f_{IF1}+f_{IF2}\pm f_{do}\pm\Delta f_d$.

Figures 4E, 4F:
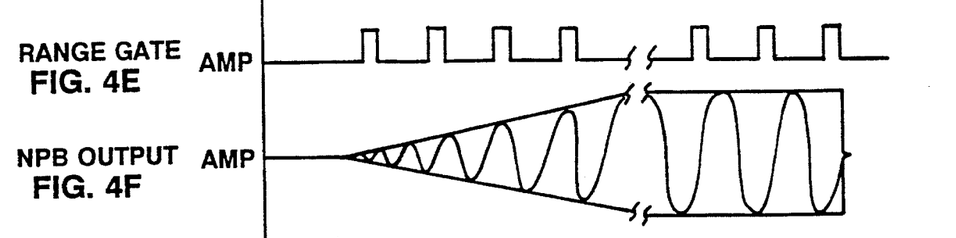

The beat frequency signals produced by the scatterers $S_1$-$S_m$ at the outputs of mixers/filters 74, 76, 78 (i.e, the signals produced in the elevation channel, ΔEL, azimuth channel, ΔAZ, and sum channel, Σ, respectively) have frequency components $(f_{s1}+f_{if2}\pm\Delta f_d), (f_{s2}+f_{if1}\pm\Delta f_d), \ldots (f_{SM}+f_{if2}\pm\Delta f_d)$. These beat frequency signal are fed to a range gating section 84. The range gating section 84 is fed by a range gate generator 85 which is fed by the range tracking error signal, $\epsilon_R$, summed in summer 66 with $R_{EST}$, on line 87. The range gating signal on line 87 corresponds to the algebraic addition of an initial estimate of the range, $R_{EST}$, to the scattering point $S_c$ on line 64 and the range tracking error signal, $\epsilon_R$, produced by a processor 24. The resulting signal is fed to the range gate generator 85 which produces a range gate window signal on line 89. The range gate signal on line 89 is centered at the range $R_c$ and has a preselected, desired, range width (ARW). Thus, the signal on line 89 is a gating pulse of duration W which begins and ends at times corresponding to the round trip range $R_c\pm(\Delta RW)/2$; i.e. centered on the reflected centroid return. Thus, the range gating section 84 passes the intermediate frequency signals fed thereto which are associated with reflections from the scatterers $S_1$–$S_m$ of the object 16 within a predetermined set, or window, $\Delta RW/2$, of ranges from the range, $R_c$, to the range centroid of object 16, as shown in FIG. 4E. Thus, here the range gates 86, 88, 90 of section 84 are initially centered at a range corresponding to the range, $R_c=R_{EST}$, of the centroid scattering point, $S_c$. The output of range gate 90, i.e., the range gate fed by the sum channel, $\Sigma$, is fed to a two to one (2:1) power splitter 92, as shown. The signals produced at the output of 2:1 power splitter 92 is fed to a narrow band filter 104 and a bi-phase (0 degree/180 degree) modulator 96, commonly referred to as a split range gate tracker.

The signals passed by the range gates 86, 88, 90 are fed to a bandpass filter section 98. The bandpass filter section 98 passes frequency components within a predetermined pass band, here $f_{IF2}\pm\Delta f$, where $2\Delta f$ is a band of frequencies which includes frequencies from $f_{S1}$ to $f_{SM}$ and includes expected doppler frequency changes $\Delta f_d$, and rejects frequency components outside such pass band, $f_{IF2}\pm\Delta f$. More particularly, the filter section 98 includes bandpass filters 100, 102, 104 fed by the signals passed by range gates 86, 88, and 90, respectively and a bandpass filter 106 fed by the bi-phase (0 degree/180 degree) modulator switch 96, as shown. The bandpass filters 100, 102, 104, 106 have a center frequency of $f_{IF2}$ and a pass band of $\Delta f$ determined by the initial velocity uncertainty (i.e., the expected $\Delta f$ and the desired range swath, or window, size. More particularly, the expected $\Delta f$ is $[2(\delta/\Delta T)(\Delta RW)/c]$+the initial doppler frequency uncertainty, where: $\delta/\Delta T$ is the frequency step rate; $\Delta RW$ is the desired range window size; and, c is the speed of light. Thus, filters 100, 102, 104, 106 have the pass band thereof selected to pass the frequencies from $f_{IF2}\pm f_{S1}\pm\Delta f_d$ to $f_{IF2}\pm f_{Sm}\pm\Delta f_d$. The bandpass filters 100, 102, 104, 106 integrate the pulses, producing a continuous wave (cw) output, i.e., the central frequency, or spectral line, region of the pulse spectrum. The output of one of the bandpass filters, here bandpass filter 106 is shown in FIG. 4F.

Figure 4G:
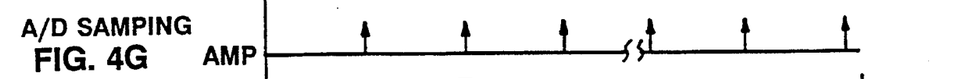
Figure 7:
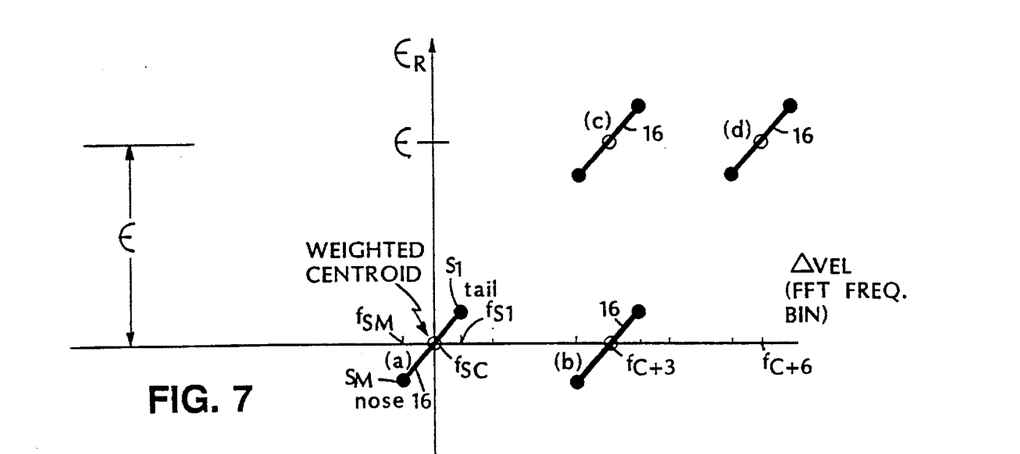
FIG. 7 is a diagram useful in understanding the radar system of FIGS. 1 and 2, such diagram showing four different conditions of the object producing the scattering points of FIG. 1, such conditions being: when the object is being tracked with zero range and velocity tracking errors (herein sometimes referred to as a "stationary" object because the object has no range tracking error, $\epsilon_R=0$ and a no velocity tracking error, $\Delta_{VEL}=0$; when the object has no range tracking error and a velocity tracking error; when the target has a range tracking error and no velocity tracking error; and, when the object has a range tracking error and a velocity tracking error.

The output of the bandpass filters 100, 102, 104, 106 are time multiplexed in time multiplexor 110. The four integrated cw outputs, one from each one of the filters 102, 104, 106, 108 are fed to an quadrature mixer 112 to produce "in-phase" (I) and "quadrature" (Q) channel signals. Also fed to the quadrature mixer 112 is a second intermediate frequency signal produced by second local oscillator 114 having a frequency $f_{IF2}$. Thus, beat frequency signals produced by quadrature mixer 112 on output 19 have a frequency spectrum from $\pm\Delta f=[\pm f_d\pm f_{S1}]$ through $[\pm f_d\pm f_{Sm}]$. Thus, the for a stationary object 16, (i.e., $f_d=0$) and where correct initial estimates have been provided for the range estimate to the centroid, (i.e., $R_{EST}=R_C$) the frequency component, $f_{SC}$, of the centroid is centered at dc (zero frequency) and the frequency components forward and rearward on the centroid are at positive frequencies and negative frequencies as shown in FIG. 7 at region (a). The beat frequency signals are fed to an analog to digital (A/D) converter section 116 which is also fed sampling pulses as shown in FIG. 4G.

The output of the A/D converter section 116 is fed to the processor 24. The processor 24, determines the frequency spectrum of the signals at output 19 and determines from such frequency spectrum, the range tracking error signal, $\epsilon_R$ for lines 20, 22, respectively. signal, $\Delta_{VEL}$ for lines 20, 22, respectively.

Figure 4H:
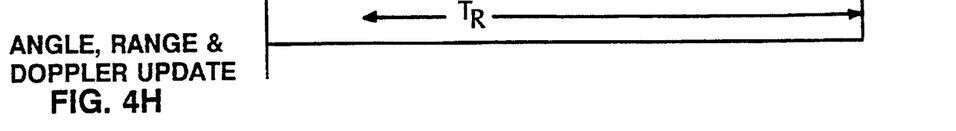
Figure 5:
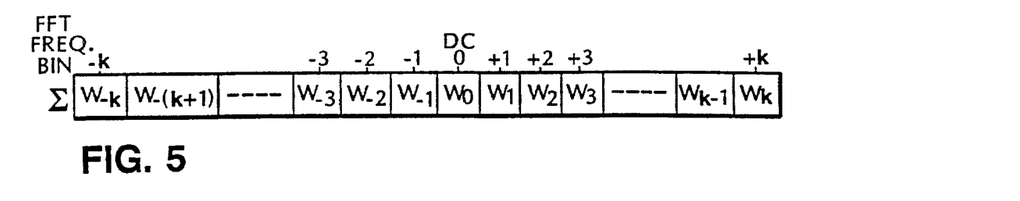
FIG. 5 is a diagram showing the frequency spectrum of returns in a sum channel, $\Sigma$, of the radar system of FIGS. 1 and 2.
Figure 6:
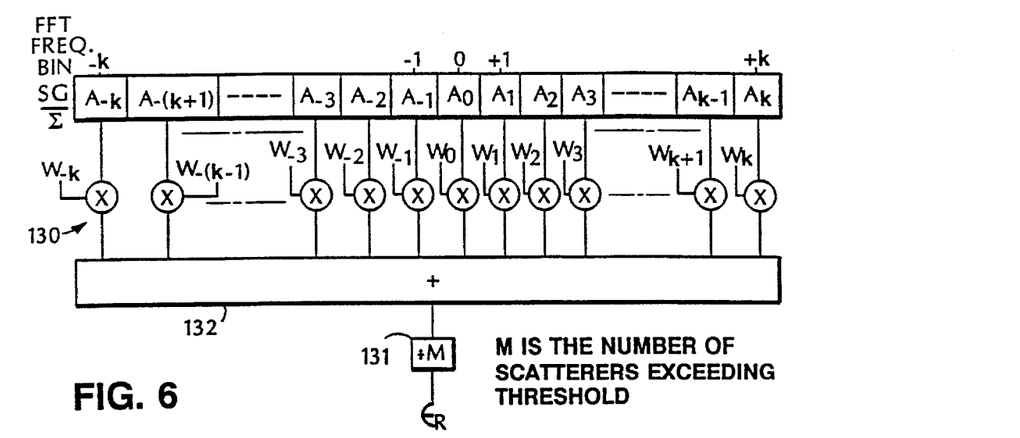
FIG. 6 is a diagram showing the frequency spectrum of returns in a bipolar range error signal, SG, produced in the radar system of FIGS. 1 and 2, normalized by the spectrum in the sum channel, Σ, together with a network for determining a range tracking error, $\epsilon_R$, signal used in the radar system of FIGS. 1 and 2.

More particularly, processor 24 includes a digital filter section 117, here Hamming weighting filters, for weighting, in the time domain, the in-phase (I) and quadrature (Q) channel signals so that, after processing by Fast Fourier Transformer (FFT) 118, FFT frequency produced sidelobes are reduced (i.e., so that interference between the FFT components used to determine the ranges $R_1$–$R_m$ are reduced). The processor 24 also includes a random access memory 120. The FFT processor 118, for one each CPI (FIGS. 4A and 4H), produces the frequency spectrum for the azimuth signal, $\Delta AZ$, the elevation signal, $\Delta EL$, the sum signal, $\Sigma$, and the split gate channel, SG. (The signals in the azimuth and elevation channels, $\Delta AZ$, $\Delta EL$, are used by a conventional angle tracking system, not shown). The frequency spectrum determined by the FFT 118 for the sum channel, $\Sigma$, is shown in FIG. 5. Thus, at the center FFT bin corresponding to dc, the complex, i.e., vector value ( complex number, a+jB) is shown as $W_O$. The frequency bins +1 through +k correspond to increasing positive frequencies and have complex values $W_{+1}$ through $W_{+k}$, respectively as shown, while the frequency bins $-1$ through $-k$ correspond to increasing negative frequencies and have complex values $W_{-1}$ through $W_{-k}$, respectively as shown. The frequency spectrum of the split gate channel, SG, after being normalized by the complex values $W_{-k}$ through $W_{+k}$ in the corresponding frequency bins of the sum channel, $\Sigma$, is shown in FIG. 6. Thus, the complex values in frequency bins $-k$ through $+k$ are $A_{-k}$ through $A_{+k}$, respectively, as shown. It should be noted that if the object 16 is stationary (i.e., $f_d=0$) and if the range estimate, $R_{EST}$ is correct, the frequency bins $-k$ through $+k$ correspond to ranges $R_1$–$R_m$ of scattering points $S_1$–$S_m$, respectively, as shown in FIG. 7 as region (a), where scatterer $S_1$ is here the nose of object 16 and scatterer $S_m$ is the tail of object 16. Further, if the object 16 is stationary and the radar system 10 is tracking the centroid of the energy reflected by the object 16 and if the centroid is at a range at the center of the range window, i.e., $\Delta R=0$, the complex value, $A_O$, is zero.

More particularly, referring to FIG. 6, a set of multipliers 130 is provided in the processor 24 for multiplying the complex values $A_{-k}$ through $A_{+k}$ by weighting factors, here the $\Sigma$ channel magnitudes $|W_{-k}|$ through $|W_{+k}|$, respectively as shown. Also, a divide by M 131 is performed by the processor 24 for proper normalization, where M is the weighted average of the number of $\Sigma$ channel magnitudes $|W_{-k}|$ through $|W_{+k}|$ greater than a predetermined threshold level. This threshold level may be determined using any conventional constant false alarm rate (CFAR) method.

For purposes of understanding, let it be assumed that the magnitudes $|W_{-k}|$ through $|W_{+k}|$ are equal (i.e., the object 16 reflects the transmitted energy equally from all scattering points $S_1$–$S_m$ along its body). Because (for a stationary target) the complex values $A_{-k}$ through $A_{-1}$ have a negative polarity while the complex values $A_{+k}$ through $A_{+1}$ have a positive polarity, the output, $\epsilon_R$, of summing network 132 of processor 24 will be $A_O=0$. Thus, if the object 16 is stationary, the output $\epsilon_R$, of summing network 132 provides an indication of the difference between the estimate range to the object (i.e., the range to which the DDS 38 and range gates 84 are centered via the signal on line 87 (FIGS. 1 and 2)), and the actual range to the centroid of the energy reflected by the object 16. Thus, the output, $\epsilon_R$, is a general measure of the energy centroid range error, for any arbitrary non-stationary target. Therefore, by feeding such signal, $\epsilon_R$, via line 20 (FIGS. 1 and 2) to the range gates 84 and the DDS 38, the center range of the range gates 84 and the DDS 38 will shift to the range $R_c$ of the centroid of the energy reflected by the object 16 thereby driving $A_O=0$, and hence the range tracking error signal, $\epsilon_R$, to zero, as shown at region (a) of FIG. 7. The frequency spectrum of SG/$\Sigma$ when the range gates 84 and DDS 38 are centered at the range to the centroid of the reflected energy is shown in FIG. 8.

Referring in more detail to FIG. 7, such FIG. 7 illustrates the relationship between the range tracking error and velocity tracking error signals, $\epsilon_R$ and $\Delta_{VEL}$, respectively, for four different conditions: object 16 is stationary, i.e., no range or velocity tracking errors, i.e., $\epsilon_R=0$ and $\Delta_{VEL}=0$, as shown in region (a) and as discussed above; (2) object 16 has no range tracking error but a velocity tracking error, $\Delta_{VEL}$, as shown in region (b); (3) object 16 has a change in range, i.e., a range error, $\epsilon_R$, and no change in velocity, as shown in region (c); and, (4) object 16 has both a range tracking error, $\epsilon_R$, and velocity tracking error $\Delta_{VEL}$, as shown in region (d).

Figure 8:
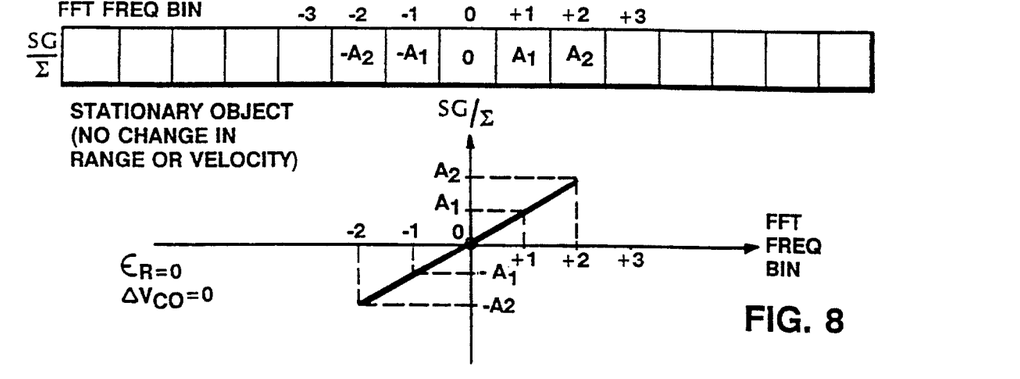
FIG. 8 shows the frequency spectrum under the condition when the object is stationary, i.e., $\epsilon_R=0$ and $\Delta_{VEL}=0$.
Figure 9:
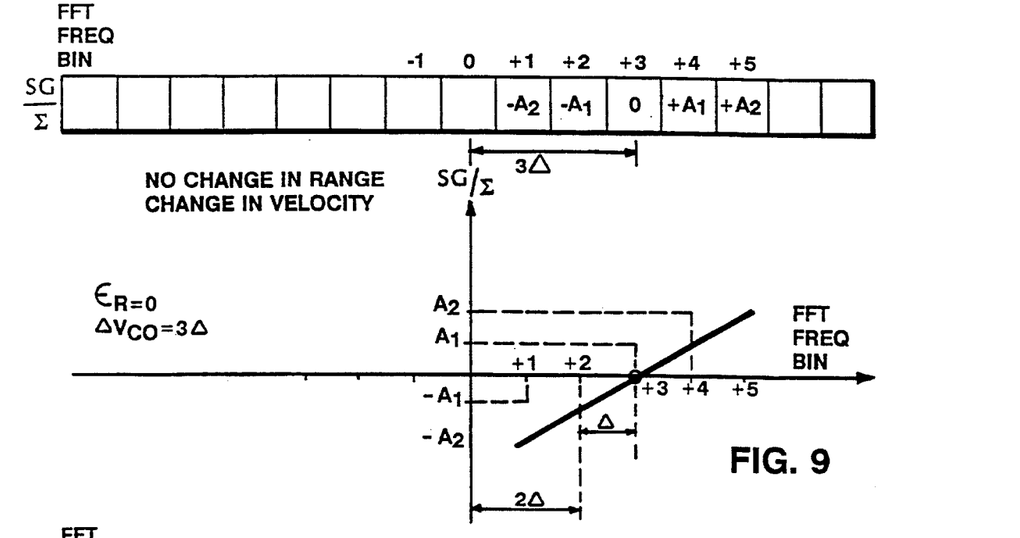
FIG. 9 shows the frequency spectrum under the condition when the object has no range tracking error, i.e., $\epsilon_R=0$, and a velocity tracking error.

Considering first the condition where the object 16 is at region (a), the normalized frequency spectrum SG/Σ is shown in FIG. 8. It is first noted that the range tracking error signal, $\epsilon_R$, is zero and the frequency component, or FFT frequency bin, where this range tracking error signal is zero is at the zero frequency. Thus, there is no error in range or velocity. Therefore, the range tracking error signal $\epsilon_R$, on line 20 for the range gates 84 and the DDS 38 is zero and the velocity tracking error signal, $\Delta_{VEL}$ on line 22 for the VCO 82 is zero. That is, ideally, if the centroid scattering point is at the center of the range gates 84, the range tracking error signal, $\epsilon_R$, should indicate a null, i.e., $\epsilon_R=0$, and the frequency bins, or cells, ahead of and behind the range $R_c$ to the centroid should indicate respective range tracking errors, $\epsilon_R$, with a progressively linear range displacement forward and aft of the centroid, as shown in the lower portion of FIG. 9. It should be noted that for any given doppler error the value of the split gate ratios, SG/Σ, will not change, but simply cause an equal frequency shift of all scattering points in the FFT frequency bin display shown in the upper portion of FIG. 8 resulting in FIG. 9. The range tracking error, $\epsilon_R$ and doppler velocity tracking error, $\Delta_{VEL}$, can therefore be effectively de-coupled since the weighted average of all the split gate ratios, SG/Σ, should always represent the true range tracking error of the centroid, irrespective of any doppler velocity tracking error.

It should be noted in FIG. 7, that the display of range tracking error versus velocity tracking error is shown for a target, or object 16, having a nose $S_1$ and a tail $S_m$. If the target was perfectly tracked in range and velocity, as in region (a), the target range centroid frequency cell would lie in the zero or center frequency bin and would indicate a range tracking error, $\epsilon_R$ of zero. The nose and tail scattering points, $S_1$, $S_m$, respectively, would occupy different FFT frequency cells forward and aft of the centroid $S_c$ and would indicate individual range tracking error components corresponding to their respective linear range displacements from the centroid.

If a pure velocity, i.e., doppler frequency error is introduced the entire display shifts to region (b), with each scattering point maintaining the same range tracking error values as in region (a). The computed range tracking error signal, $\epsilon_R$, of the centroid (i.e. the SG/Σ channel signal magnitude, $A_O$) would be zero and the frequency offset, or bin, of the centroid would be identified as the true velocity tracking error signal, $\Delta_{VEL}$. That is, referring also to FIG. 9, it is noted that SG/Σ is zero in a frequency cell, or bin other than dc, or zero. More particularly, in this example, SG/Σ has a null (i.e., $\epsilon_R=0$) at frequency bin +3. Thus, here the velocity tracking error signal, $\Delta_{VEL}$ is 3Δ, as shown. The velocity tracking error signal, $\Delta_{VEL}=3\Delta$, is fed to the VCO 82 (FIG. 2) as a correction, and as a result of the action of VCO 82, the object 16 displayed at region (b) in FIG. 7 shifts to region (a).

Figure 10:
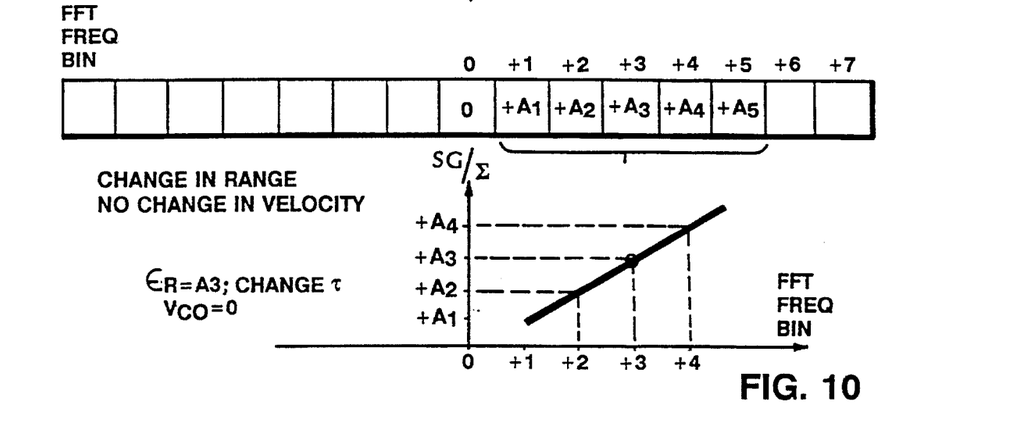
FIG. 10 shows the frequency spectrum under the condition when the object has a range tracking error an no velocity tracking error; and, FIG. 11 shows the frequency spectrum under the condition when the object has a range tracking error and a velocity tracking error.

Alternatively, if a pure range tracking error, $\epsilon_R$, is introduced, the object 16 displayed at region (a) in FIG. 7 shifts along a diagonal (representing waveform range/velocity coupling), to region (c). Thus, referring also to FIG. 10, it is first noted that a zero complex value signal in the SG/Σ signal will no longer be at a dc or zero frequency bin. It should also be noted that, while the velocity tracking error signal, $\Delta_{VEL}$, will not change the frequency of the signal produced by VCO 82, the range tracking error signal, $\epsilon_R$ is non-zero and is shifted to a higher set of frequency bins. The average value of the split gate values will equal $\epsilon_R=+A_3$, indicating the range shift of the centroid. The range tracking error signal, $\epsilon_R=+A_3$, fed via line 22 to change the output of summer 66 thereby changes the range gating signal on line 87 and the value of τ for the DDS 38. Thus, the range tracking error signal, $\epsilon_R$, when applied as a range correction to the summer 66 (FIG. 2), will re-position the target object from region (c) to region (a) of FIG. 7, with the centroid once again occupying frequency bin ), and indicating zero velocity tracking error.

Figure 11:
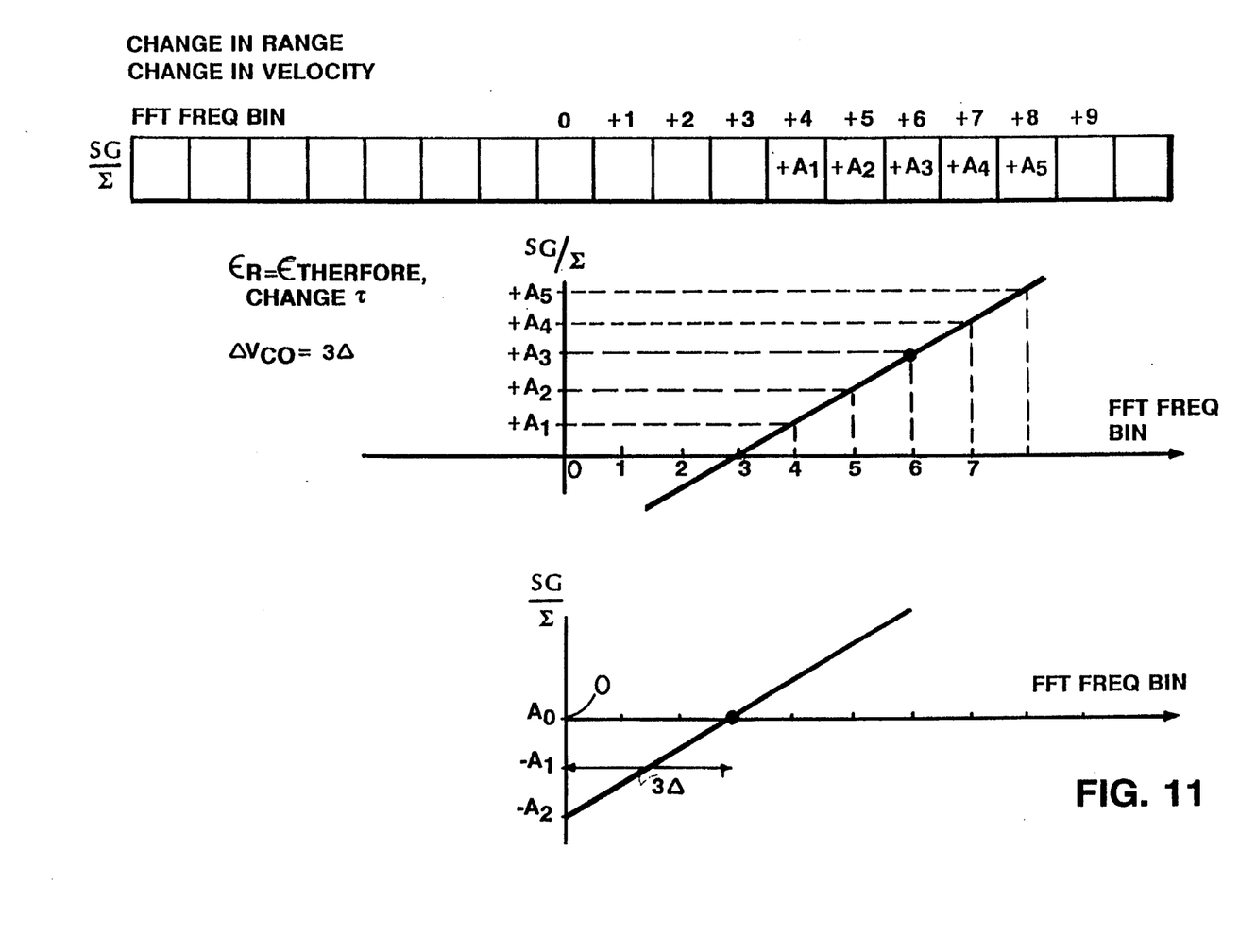

When a combination of both range and doppler velocity errors are introduced, as in region (d) of FIG. 7, the frequency spectrum of such condition is shown in FIG. 11. Thus, here the average of the split gate ratios is $+A_3$ (the centroid) corresponding to frequency bin 6. Thus, again the range tracking error signal $\epsilon_R$ changes both the range gating signal and the DDS 38 delay, τ. That is, the computed range to the centroid will be the same as for the previous region (c) of FIG. 7, assuming the same true range error component. The range tracking error signal will drive display object 16 to region (d) along a diagonal to region (b). The residual velocity, i.e., velocity error tacking signal, $\Delta_{VEL}$=bin+3, will change the frequency produced at the output of VCO 82 to thereby reposition object 16 from region (b) to region (a). Thus, range/doppler error coupling is resolved because of the fact that the response of the split gate, range tracking error signal is unambiguous with the doppler, or velocity tracking error signal.

As noted above, the signals in the azimuth and elevation channels, ΔAZ, ΔEL are used by a conventional angle tracking system, not shown. Here, however, any one of the scattering point, $S_1-S_m$, or a point associated with the object, for example the centroid of the reflected energy, may be selected to track on. For example, if it is desired to track the nose of the object, the signals in the azimuth and elevation channels, ΔAZ, ΔEL at frequency bins corresponding to the range to $S_1$ is selected to develop azimuth angle tracking signal, (ΔAZ/Σ), and elevation angle tracking signal, (ΔEL/Σ). Likewise if it is desired to track the tail, the signals in the azimuth and elevation channels, ΔAZ, ΔEL at frequency bins corresponding to the range to $S_m$ is selected to develop azimuth angle tracking signal, (ΔAZ/Σ), and elevation angle tracking signal, (ΔEL/Σ).

It should be noted that, during an initial calibration phase, a point target, not shown, is placed in front of the radar system 10 (FIG. 1). The DDS 38 is activated to generate the series of increasing frequencies, as shown in FIG. 3A. The receiver 14 processes the returns from the point target. The step sizes, δ, are then changed (i.e. adjusted) for each step in order to minimize the undesired range sidelobes produced by imbalances in the Σ, ΔEL, and ΔAZ channel gains and phases.

Other embodiments are within the spirit and scope of the appended claims.

What is claimed is:

1. A radar system, comprising:

a transmitter for transmitting a series of radio frequency (RF) pulses having sequential, incrementally changing carrier frequencies;

a receiver adapted to receive energy from points reflecting such transmitted RF pulses such receiver, comprising:

a heterodyning section, responsive to a range tracking error signal and a velocity tracking error signal for producing a series of pulsed signals for each one of the scattering points, each one of the pulsed signals sequentially changing in phase at a rate related to the range to the scattering point producing such one of the pulsed signals; and a processor, responsive to each one of the series of pulsed signal produced by the heterodyning section for determining from such frequency spectrum thereof the range tracking error signal and the velocity tracking error signal.

2. The radar system recited in claim 1 wherein the heterodyning section comprises:

a first heterodyning section, fed the series of received pulses and a series of pulses corresponding to the series of transmitted pulses delayed in time an amount related to the sum of an initial estimate of the range to a region of the object being tracked, $R_{EST}$, and the range tracking error signal, $\epsilon_R$, for producing a series of pulsed signals having frequencies related to both the velocity of the object and the ranges to the scattering points; and a second heterodyning section, fed by the series of pulses produced by the first heterodyning section, an initial estimate of the velocity of the object, and the velocity tracking error signal, for producing a series of pulses having an intermediate frequency component related to a change in the velocity of the object and frequency components related to ranges to the scattering points.

3. The system recited in claim 2 wherein the processor is responsive to the frequency spectrum of the series of pulses produced by the second heterodyning section and determines, from such frequency spectrum, the range tracking and velocity tracking error signals.

4. The system recited in claim 3 wherein the second heterodyning section includes a bandpass filter section for passing frequency components within a predetermined pass band while rejecting frequency components outside such pass band, the pass band thereof being selected to pass the frequency components related to the changes in both the velocity of the object and the ranges to the scattering points of the object.

5. The system recited in claim 4 wherein the processor, in response to the frequency spectrum of the signals passed by the bandpass filter section determines, from such frequency spectrum of the passed signals, the range and velocity tracking error signals.

6. The system recited in claim 5 wherein the second heterodyning section includes a range gating section fed by the range tracking error signal, for passing to the bandpass filter section intermediate frequency signals associated with reflections from the scatterers of the object within a predetermined window of ranges to the object.

7. The system recited in claim 6 wherein the range gating section includes a range tracker for producing a set of bipolar range error signal having a values related to the difference between the estimated range to the region of the object being tracked and measured ranges to each scattering point of the object being tracked and a polarity related to whether the ranges to the points of the object being tracked are forward of, or rearward of, the estimated range to the region of the object.

8. The system recited in claim 7 wherein the processor determines the frequency components in the bipolar range error signal and from such determined frequency components, the range tracking and velocity tracking error signals.

* * * * *